United States Patent
Uemura et al.

(10) Patent No.: US 6,828,037 B2
(45) Date of Patent: Dec. 7, 2004

(54) HYDROGEN-PERMEABLE STRUCTURE AND METHOD FOR MANUFACTURE THEREOF OR REPAIR THEREOF

(75) Inventors: Takashi Uemura, Itami (JP); Kentaro Yoshida, Itami (JP); Nobuyuki Okuda, Itami (JP); Takeshi Hikata, Itami (JP)

(73) Assignee: Sumitomo Electric Industries, Ltd., Osaka (JP)

( * ) Notice: Subject to any disclaimer, the term of this patent is extended or adjusted under 35 U.S.C. 154(b) by 24 days.

(21) Appl. No.: 10/257,599

(22) PCT Filed: Feb. 12, 2002

(86) PCT No.: PCT/JP02/01166
§ 371 (c)(1),
(2), (4) Date: Jun. 16, 2003

(87) PCT Pub. No.: WO02/064241
PCT Pub. Date: Aug. 22, 2002

(65) Prior Publication Data
US 2004/0037962 A1 Feb. 26, 2004

(30) Foreign Application Priority Data

Feb. 16, 2001 (JP) .......................................... 2001-40128
Jun. 15, 2001 (JP) ....................................... 2001-181856

(51) Int. Cl.[7] .............................. B32B 5/18; B05D 1/18
(52) U.S. Cl. .............................. 428/613; 95/45; 95/55; 95/56; 427/436; 427/437; 427/443.1; 428/545; 428/546; 428/548; 428/550; 428/551; 428/552; 428/553; 428/566; 428/670; 428/936
(58) Field of Search .............................. 428/613, 545, 428/546, 548, 550, 551, 552, 553, 566, 670, 936; 427/436, 437, 443.1; 95/45, 55, 56

(56) References Cited

U.S. PATENT DOCUMENTS 5,789,027 A  8/1998  Watkins et al. ............. 427/250
6,042,889 A  3/2000  Ballard et al. .............. 427/305

FOREIGN PATENT DOCUMENTS

| JP | 64-43541 | 2/1989 |
| JP | 3-21331 | 1/1991 |
| JP | 3-146122 | 6/1991 |
| JP | 4-193993 | 7/1992 |
| JP | 4-349926 | 12/1992 |
| JP | 9-29079 | 2/1997 |
| JP | 10-28850 | 2/1998 |
| JP | 11-267477 | 10/1999 |
| JP | 11-286785 | 10/1999 |
| JP | 2000-247605 | 9/2000 |
| JP | 2000-296316 | 10/2000 |
| JP | 2002-119834 | 4/2002 |

OTHER PUBLICATIONS

"Electroless Pd–P Alloy Plating Using Phosphite as a Reducing Agent and Mechanism of its Autocatalytic Reduction", Masaki Haga et al., Hyonmen Gijutsu, vol. 42, No. 11, pp. 90–95 (no month).

"Reactive Deposition of Metal Thin Films within Porous Supports from Supercritical Fluids", Neil E. Fernandes et al., Chem. Mater., 2001, Vo. 13, No. 2023–2031 (no month).

*Primary Examiner*—Robert R. Koehler
(74) *Attorney, Agent, or Firm*—McDermott Will & Emery LLP

(57) ABSTRACT

The invention provides a hydrogen permeable structure, which can effectively prevent peeling-off of a hydrogen permeable film and hence has higher durability, and a method of manufacturing the structure.

The hydrogen permeable structure has a hydrogen permeable film formed on the surface of or inside a porous support, having a thickness of not more than 2 μm, and containing palladium (Pd). The hydrogen permeable film is formed on the surface of or inside the porous support by supplying a Pd-containing solution and a reducing feed material from opposite sides of the porous support.

27 Claims, 3 Drawing Sheets

HYDROGEN-PERMEABLE STRUCTURE AND METHOD FOR MANUFACTURE THEREOF OR REPAIR THEREOF

TECHNICAL FIELD

The present invention generally relates to a hydrogen permeable structure and a method of manufacturing the structure, and more particularly to a hydrogen permeable structure in which a hydrogen permeable film is formed in a porous substrate, a method of manufacturing the structure, and a method of repairing the structure.

BACKGROUND ART

A hydrogen gas is used as, e.g., fuel for fuel cells and is industrially manufactured by, e.g., a gaseous fuel denaturing process. With the gaseous fuel denaturing process, for example, a hydrogen gas is manufactured by denaturing water vapor. A denatured gas contains, in addition to hydrogen as a primary component, carbon monoxide and carbon dioxide as secondary components. Direct use of such a denatured gas as, e.g., fuel for fuel cells deteriorates cell performance. It is therefore required to remove the secondary components other than the hydrogen gas, and to refine the denatured gas for obtaining a high-purity hydrogen gas. One of known refining methods utilizes a characteristic in which a hydrogen permeable film selectively allows only hydrogen to pass through the film. The hydrogen permeable film is formed on a porous support or substrate when used.

For example, Japanese Unexamined Patent Application Publication No. 11-267477 proposes a hydrogen permeable structure in which a hydrogen permeable film, such as a Pd film or a Nb film, having a thickness of about 0.1 to 20 $\mu$m is formed by an ion plating process on the surface of a porous support made of stainless steel or ceramic, e.g., alumina or silicon nitride.

Also, Japanese Unexamined Patent Application Publication No. 11-286785 proposes a hydrogen permeable structure in which a Pd metal and a metal capable of alloying with Pd are alternately multi-layered on the surface of a porous support by an electroless plating process or an ion plating process, and the multi-layers are subjected to heat treatment to form a Pd alloy film as a hydrogen permeable film.

Further, Japanese Unexamined Patent Application Publication No. 4-349926 proposes a hydrogen gas separation film in which pores of an inorganic porous body with pore sizes of 10 to 10000 Å support therein silica gel having an average pore size of 10 to 30 Å, alumina gel having an average pore size of 15 to 30 Å, or silica-alumina gel having an average pore size of 10 to 20 Å, and a thin film containing palladium is formed as a hydrogen permeable film on the surface of the porous body.

Each of the above-mentioned publications discloses the structure in which the hydrogen permeable film is formed on the surface of the porous support. However, when those hydrogen permeable structures were used in an atmosphere under various conditions, problems occurred in which the hydrogen permeable film peeled off and durability was poor.

As one example of techniques for depositing Pd on a non-metallic material such as a ceramic, electroless plating using sodium phosphite ($NaH_2PO_3$) as a reductant is disclosed in "*Hyomen Gijutsu* (Surface Technology)", 42, 1146 (1991). With this disclosed technique, however, it was impossible to freely control the plating position. Further, U.S. Pat. No. 5,789,027 discloses a method of depositing a Pd on a substrate, that is, a method in which a Pd compound is dissolved together with a hydrogen gas in a supercritical fluid of $CO_2$ so as to be supplied onto the substrate, thereby depositing Pd on the substrate. However, this disclosed method requires a fluid in the supercritical state and is not economical.

DISCLOSURE OF INVENTION

An object of the present invention is to provide a hydrogen permeable structure which can effectively prevent peeling-off of a hydrogen permeable film and hence has higher durability, and to a method of manufacturing the structure. According to the method of the present invention, the position where a thin film containing Pd is to be formed can be controlled as desired, no special technique such as a supercritical fluid is required, and defects such as pinholes can easily be repaired.

The present invention has been accomplished based on the finding that, by forming thin films within pores of a porous support in shapes corresponding to individual pore shapes, a hydrogen permeable structure being highly resistant to peeling-off of the thin films and having superior durability can be obtained because peripheries of the thin films are supported by a skeleton of the support.

According to the present invention, by supplying a solution containing Pd through one surface of a porous support and supplying a solution containing a reductant through the other surface of the porous support, the solution containing Pd and the solution containing the reductant contact with each other on the surface of or inside the porous support, whereby the Pd is reduced and metallic Pd is deposited. Therefore, thin films containing Pd can be formed on the surface of the porous support and within pores in the surface of the porous support or within pores inside the porous support.

Alternatively, by supplying a reducing gas instead of the solution containing the reductant, metallic Pd is also precipitated by means of reduction of Pd as described above such that thin films containing Pd can be formed on the surface of the porous support or within pores inside the porous support. Deposition of metallic Pd continues as long as the solution containing Pd contacts the solution containing the reductant or the reducing gas. In other words, reduction reaction continues until the pores of the porous support are sealed off by Pd.

In the case using the reducing gas, by filling a material permeable to the reducing gas within the pores of the porous support, a thin film containing Pd can be formed on an end surface of the reducing-gas permeable material. Therefore, the Pd thin film can be formed at a desired position within the porous support.

The solution containing Pd is not limited to a particular one provided that the solution contains palladium. Examples of such solution include a solution of a Pd complex ion in which ligands, such as $NO_2$ and $NH_3$, are coordinated in number not less than two and not more than six, and a solution of palladium chloride or palladium nitrate. Also, the solution containing Pd is preferably a solution containing chlorine and palladium. Further, the solution containing Pd is preferably a solution containing platinum as well as chlorine and palladium. A hydrogen permeable film containing Pd to which Pt is added has less solubility to hydrogen at a predetermined temperature than that containing Pd alone. Therefore, an amount of expansion of the crystal lattice of a palladium metal, i.e., an amount of expansion of the film, can be suppressed. It is hence possible to reduce compressive stresses caused in the film upon expansion thereof, and hence to reduce stresses imposed on the interface between the film and a substrate. As a result, physical deterioration of the hydrogen permeable film, such as peeling-off and cracks, can be greatly reduced.

The solution containing the reductant is, for example, a solution containing, as a reductant, a phosphate or a hypophosphite, e.g., $H_2PO_2^-$ or $HPO_3^{2-}$, hydrazine, formaldehyde, dimethylamine borane, or any of tetrahydra borates such as $NaBH_4$, $LiBH_4$ and $KBH_4$. Preferably, the solution containing the reductant is an alcoholic or aqueous solution in which at least one of those reductants is dissolved.

By spraying with a sprayer either or both of the solution containing Pd and the solution containing the reductant in a state of mist, for example, disturbance at the interface between the Pd-containing solution and the reductant-containing solution is reduced and the pores can be sealed off with thinner films. Accordingly, the spraying method is able to reduce the amount of deposited Pd to a value not more than 5 g/m$^2$ and is more economical. Herein, the term "amount of deposited Pd" represents a value normalized with respect to a Pd deposited area regardless of shape of the hydrogen permeable structure. More specifically, an area of 1 to 10 cm$^2$ of the hydrogen permeable structure, in which Pd has been deposited, is cut out from any desired position, and a cut-out specimen is dissolved in an acid. The Pd concentration of the thus obtained solution is analyzed with plasma emission spectroscopic analysis to calculate a total amount of Pd. Then, the amount of deposited Pd is obtained by dividing the total amount of Pd by the area of the specimen.

The reducing gas is preferably a hydrogen gas, but any other suitable gas may be mixed in a hydrogen gas for control of the reaction velocity. Further, the gas permeable material is preferably paraffin. Paraffin is permeable to hydrogen and can be dissolved and removed with an organic solvent, such as dichloromethane.

Preferably, thin films formed inside the porous support and containing Pd have an average thickness of not more than 2 μm and not less than 0.01 μm. Also, thin films formed on the surface of the porous support and containing Pd have an average thickness of not more than 2 μm and not less than 0.01 μm. In the thin films formed inside or on the surface of the porous support and containing Pd, the deposition rate of Pd is preferably not more than 5 g/m$^2$. The porous support is preferably a porous body of silicon nitride or a metallic porous body.

Further, the porous support has holes in the surface thereof, and preferably is provided with a porous oxide layer, or a layer of metal or metal oxide having an average particle size of not more than 2 μm such that the holes are covered therewith. With such structure, since the holes in the surface of the porous support are filled, making the surface even, the hydrogen permeable film can be formed in a dense state free from pinholes when it is formed on the surface of the porous support. Accordingly, the permeability characteristics of the hydrogen permeable film can be improved. In such a case, preferably, the oxide layer contains at least one selected from the group consisting of aluminum oxide ($Al_2O_3$), silicon dioxide ($SiO_2$) and zirconium oxide ($ZrO_2$). The oxide layer is more preferably made of aluminum oxide.

In the hydrogen permeable structure in which a Pd-containing thin film has been formed on the surface of or inside the porous support thereof, defects of the Pd-containing thin film, such as pinholes, can easily be repaired by supplying the solution containing Pd onto one surface of the hydrogen permeable structure and supplying the solution containing the reductant onto the other surface of the hydrogen permeable structure, since thereby a metal containing Pd can be deposited in the pinholes with priority. In that case, a similar effect is also obtained by using a reducing gas instead of the solution containing the reductant.

If a hydrogen permeable structure includes a layer in which pores are sealed off by depositing a metal containing Pd in a porous support and/or porous powder, its durability can be further improved. In such a hydrogen permeable structure, an amount of nitrogen permeable through the structure can be reduced to a level not more than 0.6 ml/min/cm$^2$ under a differential pressure of 1 atmospheric pressure. As a result, hydrogen having a higher purity can be obtained.

Additionally, a Pd-containing film can be made denser by performing heat treatment of the Pd-containing film in a non-oxidizing atmosphere, e.g., a vacuum, a nitrogen atmosphere or a hydrogen atmosphere, after the Pd-containing film has been formed.

BEST MODE FOR CARRYING OUT THE INVENTION

Figure 1:
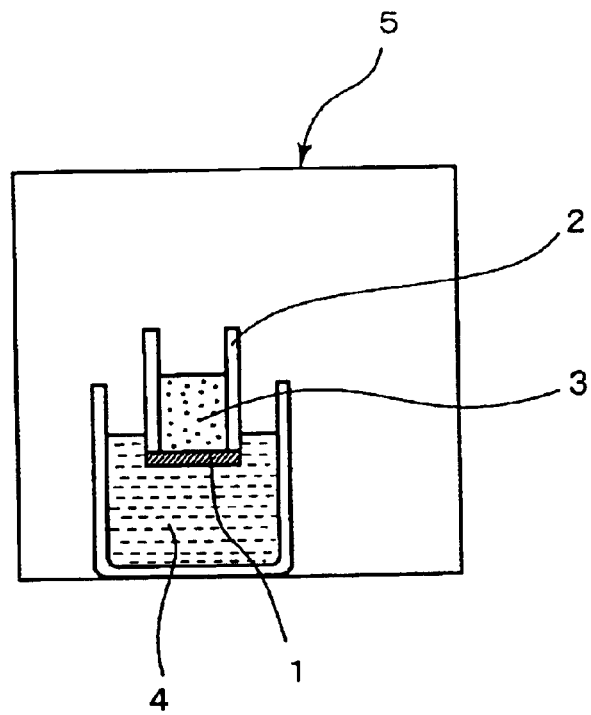
FIG. 1 shows one embodiment of the present invention in which a reducing feed material is a solution.

A hydrogen-gas separating structure as one embodiment of a hydrogen permeable structure of the present invention is constructed by forming metallic thin films, containing Pd, within pores of a porous support or the surface of the porous support.

The porous support has no special limitation on materials thereof, and can be made of a metallic material such as SUS316L, or any of ceramics including various oxides, e.g., aluminum oxide, and various nitrides, e.g., silicon nitride. Among ceramics, a porous body of silicon nitride is particularly preferable. The pore size of the porous support is not limited to a particular value, but it is preferably not more than 1 μm and not less than 0.1 μm. If a porous support having the pore size over 1 μm is used, the thin films formed in pores and containing Pd would be too thick, thus resulting in being less economical and deterioration of hydrogen permeability. If the pore size is less than 0.1 μm, the thin films would be too thin, thus resulting in problems in terms of durability.

According to the manufacturing method of the present invention, a solution feed material containing Pd is supplied through one surface of the porous support, and a reducing feed material is supplied through the other surface thereof.

Upon contact of the solution containing Pd and the reducing feed material, Pd is reduced and metallic Pd is deposited, whereby the thin film(s) containing Pd can be formed on the surface of the porous support or within the pores inside the porous support. Also, by adjusting the concentration and reaction conditions of either or both of the Pd containing solution and the reducing feed material, the thin films containing Pd can be formed only inside the porous support, i.e., in a region inward of the surface of the porous support. Since the thus obtained thin films are formed within the pores of the porous support, those thin films are surrounded by the skeleton (matrix) of the porous support and high durability can be obtained. Particularly, when the thin films are formed only inside the porous support, those thin films are entirely surrounded by the skeleton (matrix) of the porous support and hence higher durability can be obtained. Note that, if both the feed materials are supplied onto the same surface, the thin films containing Pd cannot be formed in the porous support because fine particles of metallic Pd start deposition immediately after the feed materials are in contact with each other.

The hydrogen permeability of the hydrogen permeable film is in reverse proportion to a film thickness. For example, the permeability of hydrogen through a 2 $\mu$m-thick film is 10 times the permeability through a 20 $\mu$m-thick film. With a 10-time increase in hydrogen permeability through the film, the film surface area required for obtaining the same amount of hydrogen permeable through the film is reduced to $\frac{1}{10}$. Thus, when the thickness of the hydrogen permeable film is reduced to $\frac{1}{10}$, the required weight of the film is reduced to $\frac{1}{100}$. According to the present invention, therefore, since a dense hydrogen permeable film having good hydrogen permeability can be formed in thickness of not more than 2 $\mu$m, it is possible to provide a low-cost, high-performance and compact hydrogen permeable structure. Conversely, if the film thickness is less than 0.01$\mu$, problems such as the deterioration of the hydrogen separation performance and a decrease of durability would occur.

In the solution containing Pd, any of a palladium complex, palladium chloride, palladium acetate, etc. is usable as a solute. Also, by adjusting a PH of the solution with acids or bases, such as hydrochloric acid and acetic acid, the maximum solubility of the solute can be adjusted and hence the reduction reaction velocity can also be adjusted. Further, by employing a solution in which a platinum compound, a silver compound, or the like is dissolved together with a Pd compound, thin films of a Pd—Pt alloy or a Pd—Ag alloy can be formed. A preferable example of the platinum compound is platinum chloride or a platinum organic complex, and a preferable example of the silver compound is silver chloride or a silver organic complex.

The reducing feed material may be in the form of a liquid or gas. In the case of a liquid, a solution containing a reductant is usable. When dimethylamine borane, $NaBH_4$, $LiBH_4$, $KBH_4$, or the like is used as the reductant, not only water but also alcohol can be used as a solvent. However, in the case of $LiBH_4$ in particular, an alcoholic solution is preferably used since $LiBH_4$ decomposes upon reaction with water, though it has maximum reducing power. Using an alcoholic solution is advantageous in that, by increasing the size of a hydrophobic radical in alcohol, affinity with an aqueous solution containing Pd ions can be reduced, and hence a more local and thinner Pd-containing film can be formed. Further, in the case where both of the Pd-containing solution and the reductant-containing solution are used, by spraying either or both of the solutions in a state of mist with a sprayer, for example, disturbance at the interface between the Pd-containing solution and the reductant-containing solution is reduced, and hence the pores can be sealed off with thinner films. Accordingly, the spraying method is able to reduce the amount of Pd used and is more economical.

In the case using gas, any reducing gas can be used, but a preferable example is hydrogen. Also, a gas mixture with another kind of gas may also be used to control the reaction velocity. Further, by filling the porous support beforehand with a material that is gas permeable and can be removed later, it is possible to control the position where the hydrogen permeable film is to be formed. One example of such a filling material is paraffin. Paraffin is hydrogen permeable. For example, if paraffin is filled to half the thickness of the porous support and the Pd-containing solution is supplied from the side that is not filled with paraffin and hydrogen is supplied from the side that is filled with paraffin, then, the supplied hydrogen passes through the paraffin and reaches the paraffin surface, whereupon reduction reaction occurs between the Pd-containing solution and hydrogen gas, and a hydrogen-permeable film containing Pd can be formed on the paraffin surface. By adjusting the amount of paraffin filled, the position where the film is to be formed can be controlled. After the hydrogen-permeable film containing Pd has been formed, the paraffin can be dissolved and removed using an organic solvent, e.g., dichloromethane.

When the solution containing Pd ions contacts the reducing feed material, Pd is reduced and a metal containing Pd is deposited. The metal is gradually deposited within the pores of the porous support such that eventually the metal fills the pores at a certain thickness and seals off the pores. The reduction reaction continues until the pores are completely sealed off. The thickness of the thin films containing Pd and the position where the thin films are formed inside the porous support can be controlled in accordance with, e.g., the pore size of the porous support, the concentration of the Pd-containing solution, the concentration of the reductant in the reducing feed material, and the reaction temperature, as well as the kind of solvent and a PH when the reducing feed material is a solution.

The porous support has no limitation in its shape. In the case of a flat plate, the Pd-containing solution and the reductant-containing solution may be supplied to the plate from opposite sides. In the case of a hollow cylinder, those solutions can be supplied through an inner peripheral surface and an outer peripheral surface of the cylinder.

In the method of manufacturing the hydrogen permeable structure according to the present invention, the reduction reaction continues until the pores are completely sealed off, as described above. This means that when defects such as pinholes are present in the formed hydrogen permeable film, the reduction reaction occurs first in those defects such as pinholes. In other words, defects such as pinholes caused in the hydrogen permeable structure can easily be repaired by applying the method according to the present invention since a metal containing Pd can be thereby deposited only in the defects such as pinholes. The method of the present invention is also, applicable to the case of regenerating a failed structure.

Further, a feature of the hydrogen permeable structure according to the present invention is that it has a layer formed by depositing a metal containing Pd in the porous support or porous powder so as to sealed off pores, and that the amount of nitrogen permeable through the structure is small: not more than 0.6 ml/min/cm$^2$ under a differential pressure of 1 atmospheric pressure. Accordingly, hydrogen having a high purity can be obtained.

EXAMPLE 1

A disk having a diameter of 22 mm and a thickness of 1 mm was prepared by machining a porous sintered body of silicon nitride 1 with a pore size of 0.3 μm. The disk was glass-bonded, as shown in FIG. 1, to one end surface of a cylindrical holder 2 made of a dense ceramic and having an outer diameter of 22 mm. After pouring, in the dense ceramic cylindrical holder, 20 ml of a solution that was prepared by dissolving 30 g of $Pd(NO_3)_2$ in 1 liter of 1N-nitric acid, the cylinder was immersed in a 1.0 g/l aqueous solution of dimethylamine borane 4 for 2 minutes within a thermostatic chamber 5. The solution temperature was adjusted so as to be maintained at 25° C. using a heater and a cooler (not shown). After 2 minutes, the grass-bonded disk and cylindrical holder were removed from the thermostatic chamber, and a porous support disk was obtained by disconnecting the glass bonding. The surface of the porous support disk, which had been subjected to the aqueous solution of dimethylamine borane, had a black discoloration and exhibited electrical continuity. It was hence confirmed that a Pd metal was deposited.

The thus obtained disk was heat-treated at a temperature of 500° C. for 1 hour in hydrogen under 101.325 kPa (1 atmospheric pressure). After the heat treatment, the Pd structure was measured by X-ray diffraction and confirmed to be of face-centered cubic lattice. Then, the disk was cut and the cut section was observed with an electron microscope. As a result, it was confirmed that Pd was deposited in pores up to a depth of 0.5 μm from the surface having a black discoloration, and Pd thin films of 0.5 μm thickness were formed in the pores.

The hydrogen permeability of the hydrogen permeable structure obtained as described above was measured. More specifically, the permeation amount of hydrogen or nitrogen was measured by introducing a pure gas of hydrogen or nitrogen at a temperature of 400° C. through one surface of the hydrogen permeable structure under a pressure difference of 101.325 kPa (1 atmospheric pressure). As a result, it was confirmed that the permeation amount of hydrogen was 80 ml/min/cm$^2$ and the permeation amount of nitrogen was 0.05 ml/min/cm$^2$, and hence that practically only hydrogen was allowed to selectively pass through the structure. Also, a heat cycle test of 500 cycles was conducted between temperature of 400° C. and room temperature in a hydrogen gas atmosphere of 101.325 kPa (1 atmospheric pressure). After the test, peeling-off and cracks of the films were inspected by visual observation and by using an electron microscope, respectively. As a result, no physical deterioration of the films, such as peeling-off and cracks, was observed.

EXAMPLE 2

A porous disk made of silicon nitride and a cylindrical holder made of a dense ceramic, similar to those used in EXAMPLE 1, were prepared. After pouring 20 ml of a solution that was prepared by dissolving 30 g of $Pd(NO_2)_2(NH_3)_2$ in 1 liter of 1N-nitric acid, into the dense ceramic cylindrical holder, the cylinder was immersed in a solution, which was prepared by dissolving 2.0 g of $NaH_2PO_2$ in 1 liter of pure water, for 2 minutes within a thermostat. The solution temperature was adjusted so as to be maintained at 25° C. using a heater and a cooler (not shown). After 2 minutes, the grass-bonded disk and cylindrical holder were removed from the thermostatic chamber, and a porous support disk was obtained by disconnecting the glass bonding.

The thus obtained disk was measured for the hydrogen permeability in the same manner as in EXAMPLE 1. As a result, it was confirmed that the permeation amount of hydrogen was 60 ml/min/cm$^2$ and the permeation amount of nitrogen was 0.03 ml/min/cm$^2$, and hence that practically only hydrogen was allowed to selectively pass through the disk.

EXAMPLE 3

A porous disk made of silicon nitride and a cylindrical holder made of a dense ceramic, similar to those used in EXAMPLE 1, were prepared. After pouring 20 ml of a solution that was prepared by dissolving 30 g of $Pd(NO_2)_2(NH_3)_2$ in 1 liter of 1N-nitric acid, into the dense ceramic cylindrical holder, the cylinder was immersed in a solution, which was prepared by dissolving 3.0 g of hydrazine in 1 liter of pure water, for 2 minutes within a thermostat. The solution temperature was adjusted so as to be maintained at 25° C. using a heater and a cooler (not shown). After 2 minutes, the grass-bonded disk and cylindrical holder were removed from the thermostatic chamber, and a porous support disk was obtained by disconnecting the glass bonding.

The thus obtained disk was measured for the hydrogen permeability in the same manner as in EXAMPLE 1. As a result, it was confirmed that the permeation amount of hydrogen was 60 ml/min/cm$^2$ and the permeation amount of nitrogen was 0.03 ml/min/cm$^2$, and hence that practically only hydrogen was allowed to selectively pass through the disk.

EXAMPLE 4

Figure 2:
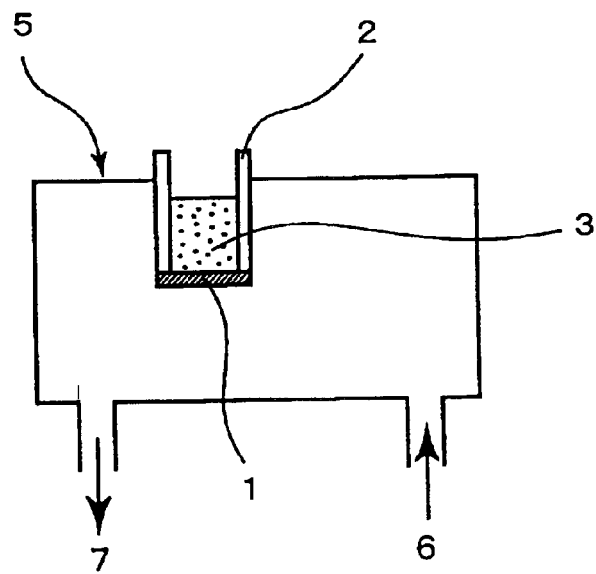
FIG. 2 shows one embodiment of the present invention in which a reducing feed material is a gas.

A porous disk made of silicon nitride 1 and a cylindrical holder made of a dense ceramic 2, similar to those used in EXAMPLE 1, were prepared. After glass-bonding the disk to one end surface of the dense ceramic cylindrical holder as in EXAMPLE 1, a solution of $Pd(NO_3)_2$ 3 was poured into the cylindrical holder and, as shown in FIG. 2, the cylindrical holder was placed in a thermostatic chamber 5 such that the surface of the $Pd(NO_3)_2$ was positioned outside the thermostat. Then, a hydrogen gas of 101.325 kPa (1 atmospheric pressure) was introduced into the thermostat. After introducing the hydrogen gas for 5 minutes, the porous disk made of silicon nitride was removed from the thermostatic chamber. The surface of the disk, which had been subjected to the hydrogen gas, had a black discoloration and exhibited electrical continuity. It was hence confirmed that a Pd metal was deposited. The thus obtained disk was cut and the cut section was observed with an electron microscope. As a result, it was confirmed that Pd was deposited in pores up to a depth of 0.8 μm from the surface having a black discoloration, and Pd thin films of 0.8 μm thickness were formed in the pores. Note that thin films containing Pd can also be formed by putting into the thermostatic chamber, as in FIG. 1, the entirety of the container made of the porous silicon nitride disk and the dense ceramic cylindrical holder, in which the $Pd(NO_3)_2$ solution is filled. This method, however, is uneconomical because the reduction reaction occurs at the surface of the Pd-containing solution in the container as well and Pd is also deposited there.

The hydrogen permeability of the hydrogen permeable structure obtained as described above was measured in the same manner as in EXAMPLE 1. As a result, it was confirmed that the permeation amount of hydrogen was 60 ml/min/cm$^2$ and the permeation amount of nitrogen was 0.03 ml/min/cm$^2$, and hence that practically only hydrogen was allowed to selectively pass through the structure. Also, a heat cycle test of 500 cycles was conducted between temperature of 400° C. and room temperature in a hydrogen gas atmosphere of 101.325 kPa (1 atmospheric pressure). After the test, peeling-off and cracks of thin films were inspected by visual observation and by using an electron microscope, respectively. As a result, no physical deterioration of the films, such as peeling-off and cracks, was observed.

EXAMPLE 5

Figure 3:
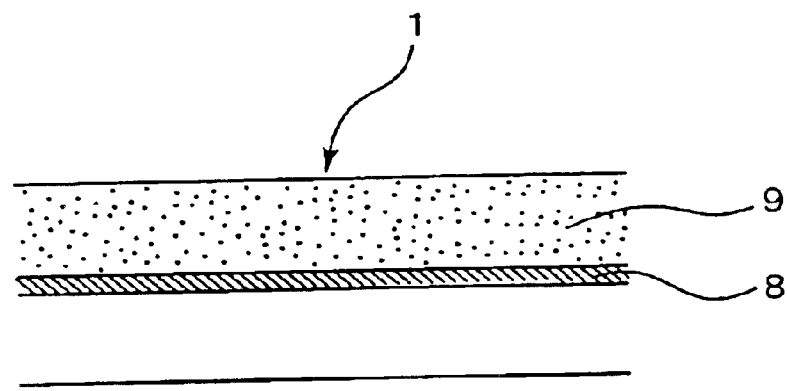
FIG. 3 shows a cross-section of one example of a hydrogen permeable structure according to the present invention. The pores of a porous support are omitted in the drawing.

A disk having a diameter of 22 mm and a thickness of 1 mm was prepared by machining a porous sintered body of silicon nitride having a pore size of 0.3 µm. Paraffin having the melting point of 70° C. was filled in the disk up to a depth of 0.5 mm. The disk was glass-bonded to one end surface of a cylindrical holder made of a dense ceramic and having an outer diameter of 22 mm such that the disk surface filled with the paraffin was faced outward. After pouring 20 ml of a solution that was prepared by dissolving 30 g of $Pd(NO_3)_2$ in 1 liter of 1N-nitric acid, into the dense ceramic cylindrical holder, the cylindrical holder was put into a thermostat. A hydrogen gas of 101.325 kPa (1 atmospheric pressure) was then, introduced into the thermostat and such a condition was held for 5 minutes, during which period the temperature in the thermostat was maintained at 25° C. After 5 minutes, the porous disk made of silicon nitride was removed from the thermostat. No change was observed in the external appearance of the disk. The disk was cut and the cut section was observed with an electron microscope. As a result, as schematically illustrated in FIG. 3, it was confirmed that a Pd film 8 was deposited in pores with a thickness of 0.3 µm from the forefront surface of the filled paraffin 9, and Pd thin films were formed in the pores, in thickness of 0.3 µm from the position of 0.5 mm in the direction of thickness of the porous disk made of silicon nitride.

The paraffin was dissolved and removed by three repetitions of immersing the hydrogen permeable structure obtained as described above in dichloromethane for 15 minutes, replacing the dichloromethane with new dichloromethane, at each 15-minute immersion. After drying the hydrogen permeable structure, it was heat-treated at a temperature of 500° C. for 1 hour in hydrogen under 101.325 kPa (1 atmospheric pressure). The hydrogen permeability of the thus obtained hydrogen permeable structure was measured in the same manner as in EXAMPLE 1. As a result, it was confirmed that the permeation amount of hydrogen was 90 ml/min/cm$^2$ and the permeation amount of nitrogen was 0.05 ml/min/cm$^2$, and hence that practically only hydrogen was allowed to selectively pass through the structure. Also, a heat cycle test of 500 cycles was conducted between temperature of 400° C. and room temperature in a hydrogen gas atmosphere of 101.325 kPa (1 atmospheric pressure). After the test, peeling-off and cracks of the films were inspected by visual observation and by using an electron microscope, respectively. As a result, no physical deterioration of the films, such as peeling-off and cracks, was observed.

EXAMPLE 6

As in EXAMPLE 1, an assembly of a porous disk made of silicon nitride and a cylindrical holder made of a dense ceramic was prepared by glass-bonding them. A solution prepared by dissolving 27 g of $Pd(NO_3)_2$ and 3 g of $Pt(NO_2)_2(NH_3)_2$ in 1 liter of 1N-nitric acid was poured into the dense ceramic cylindrical holder. Then, the cylinder was immersed in a 1.0 g/l aqueous solution of dimethylamine borane for 2 minutes within a thermostat. The solution temperature was adjusted so to be maintained at 25° C. After 2 minutes, the grass-bonded disk and cylindrical holder were removed from the thermostatic chamber, and a porous support disk was obtained by disconnecting the glass bonding. The thus obtained disk was heat-treated at a temperature of 500° C. for 1 hour in hydrogen under 101.325 kPa (1 atmospheric pressure). Then, the disk was cut and the cut section was observed with an electron microscope. As a result, it was confirmed that a metal was deposited in pores up to a depth of 0.5 µm, and metallic thin films of 0.5 µm thickness were formed in the pores. The composition of the metallic thin films was examined by fluorescent X-ray analysis, and it was found to be 89 wt % Pd and 11 wt % Pt.

The hydrogen permeability of the hydrogen permeable structure obtained as described above was measured in the same manner as in EXAMPLE 1. As a result, it was confirmed that the permeation amount of hydrogen was 90 ml/min/cm$^2$ and the permeation amount of nitrogen was 0.05 ml/min/cm$^2$, and hence that practically only hydrogen was allowed to selectively pass through the structure. Also, a heat cycle test of 500 cycles was conducted between the temperature of 400° C. and room temperature in a hydrogen gas atmosphere of 101.325 kPa (1 atmospheric pressure). After the test, peeling-off and cracks of the films were inspected by visual observation and by using an electron microscope, respectively. As a result, no physical deterioration of the films, such as peeling-off and cracks, was observed.

EXAMPLE 7

A disk having a diameter of 22 mm and a thickness of 1 mm was prepared using porous SUS316L with a filtration size of 0.5 µm. The disk was silver-brazed to one end surface of a cylinder made of a dense SUS316L and having an outer diameter of 22 mm. After pouring the same solution as used in EXAMPLE 1 into the cylinder, the cylinder was immersed in a solution of a reductant (propanol) within a thermostat, the solution being the same as used in EXAMPLE 1. After 10 minutes, the porous disk made of porous SUS316L was removed from the thermostatic chamber.

The thus obtained disk was heat-treated at a temperature of 500° C. for 1 hour in hydrogen under 101.325 kPa (1 atmospheric pressure). After the heat treatment, the disk was cut and the cut section was observed with an electron microscope. As a result, it was confirmed that Pd was deposited in pores up to a depth of 1.5 µm, and Pd thin films of 1.5 µm thickness were formed in the pores.

The hydrogen permeability of the hydrogen permeable structure obtained as described above was measured in the same manner as in EXAMPLE 1. As a result, it was confirmed that the permeation amount of hydrogen was 30 ml/min/cm$^2$ and the permeation amount of nitrogen was 0.01 ml/min/cm$^2$, and hence that practically only hydrogen was allowed to selectively pass through the structure. Also, a heat cycle test of 500 cycles was conducted between the temperature of 400° C. and room temperature in a hydrogen gas atmosphere of 101.325 kPa (1 atmospheric pressure). After the test, peeling-off and cracks of the films were inspected by visual observation and by using an electron microscope, respectively. As a result, no physical deterioration of the films, such as peeling-off and cracks, was observed.

EXAMPLE 8

A disk having a diameter of 22 mm and a thickness of 1 mm was prepared by machining a porous sintered body of silicon nitride having a pore size of 0.3 μm. One surface of the disk was polished with a polishing solution including γ-alumina powder of a 0.05-μm average particle size dispersed therein. Also, the γ-alumina powder was filled into holes of the disk surface to make it flat. Subsequently, the disk filled with the γ-alumina powder was sintered in an atmosphere at 750° C. for 30 minutes. The thus sintered disk was glass-bonded, as shown in FIG. 1, to one end surface of a cylindrical holder made of a dense ceramic and having an outer diameter of 22 mm, at which time, the disk surface flattened with the y-alumina powder was positioned to face outward of the cylinder (downward in FIG. 1). After pouring 20 ml of a solution prepared by dissolving 25 g of $PdCl_2$ in 1 liter of 1N-hydrochloric acid, into the dense ceramic cylindrical holder, the holder was immersed in a 1.0 g/l aqueous solution of dimethylamine borane for 2 minutes within a thermostat. The solution temperature was adjusted so as to be maintained at 25° C. using a heater and a cooler (not shown). After 2 minutes, the grass-bonded disk and cylindrical holder were removed from the thermostatic chamber, and a porous support disk was obtained by disconnecting the glass bonding. The surface of the porous support disk, which had been subjected to the aqueous solution of dimethylamine borane, had metallic luster and exhibited electrical continuity. It was hence confirmed that a Pd metal was deposited.

Figure 4:
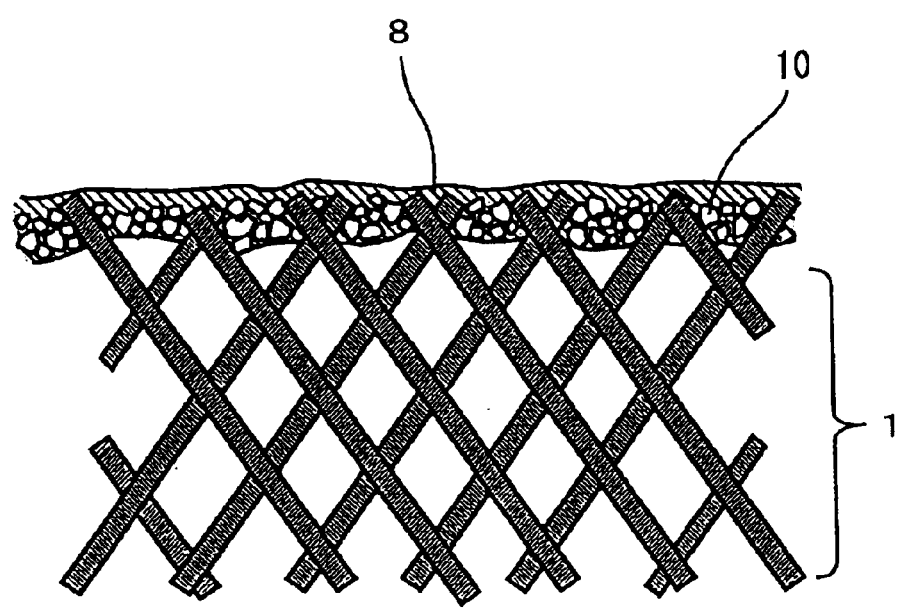
FIG. 4 is a schematic sectional view of one embodiment of the present invention, showing a state in which hydrogen permeable films are formed on the surface of and inside the porous support with alumina powder filled on the surface thereof.

The thus obtained disk was heat-treated at a temperature of 500° C. for 1 hour in hydrogen under 101.325 kPa (1 atmospheric pressure). After the heat treatment, the disk was cut and the cut section was observed with an electron microscope. FIG. 4 schematically shows the observed section. As a result of the observation, it was confirmed that the γ-alumina 10 was filled into pores of the porous silicon nitride up to a depth of 0.5 μm from the Pd-deposited disk surface and Pd 8 was deposited in gaps between particles of the γ-alumina powder. It was also confirmed that Pd 8 deposited on the disk surface was in the form of a thin film having a thickness of 0.1 μm. Further, as a result of observing the disk surface with a Scanned Electron Microscope (SEM), it was confirmed that nearly 100% area of the entire disk surface was covered with Pd.

The hydrogen permeability of the hydrogen permeable structure obtained as described above was measured in the same manner as in EXAMPLE 1. As a result, it was confirmed that the permeation amount of hydrogen was 120 ml/min/cm$^2$ and the permeation amount of nitrogen was 0.05 ml/min/cm$^2$, and hence that practically only hydrogen was allowed to selectively pass through the structure. Also, a heat cycle test of 500 cycles was conducted between the temperature of 400° C. and room temperature in a hydrogen gas atmosphere of 101.325 kPa (1 atmospheric pressure). After the test, peeling-off and cracks of the film were inspected by visual observation and by using an electron microscope, respectively. As a result, no physical deterioration of the film, such as peeling-off and cracks, was observed.

EXAMPLE 9

A disk having a diameter of 22 mm and a thickness of 1 mm was prepared by machining a porous sintered body of silicon nitride having a pore size of 0.3 μm. One surface of the disk was polished with a polishing solution including γ-alumina powder of a 0.05-μm average particle size dispersed therein. Also, the γ-alumina powder was filled into holes in the disk surface to make it flat. The disk filled with the γ-alumina powder was glass-bonded to one end surface of a cylindrical holder made of a dense silicon nitride and having an outer diameter of 22 mm, at which time, the disk surface flattened with the γ-alumina powder was positioned to face outward of the cylinder. Then, 20 ml of a solution prepared by dissolving 25 g of $PdCl_2$ in 1 liter of 1N-hydrochloric acid was poured into the dense silicon-nitride cylindrical holder. A 2-propanol solution containing 0.25 g/l of $NaBH_4$ was filled into a sprayer, and mist of the solution was sprayed on the outer surface of the bonded disk. With the spray of the solution in the state of mist, drips falling from the disk were black in the initial period, thus showing the progress of reduction reaction. After continuing to spray for about 5 minutes, falling drips became transparent, whereupon it was determined that the reduction reaction was completed. Then, spraying of the solution was stopped, and a porous support disk was obtained by disconnecting the glass bonding. The surface of the porous support disk, which had been subjected to the spray of the solution, was black and exhibited electrical continuity. It was hence confirmed that a Pd metal was deposited.

Figure 5:
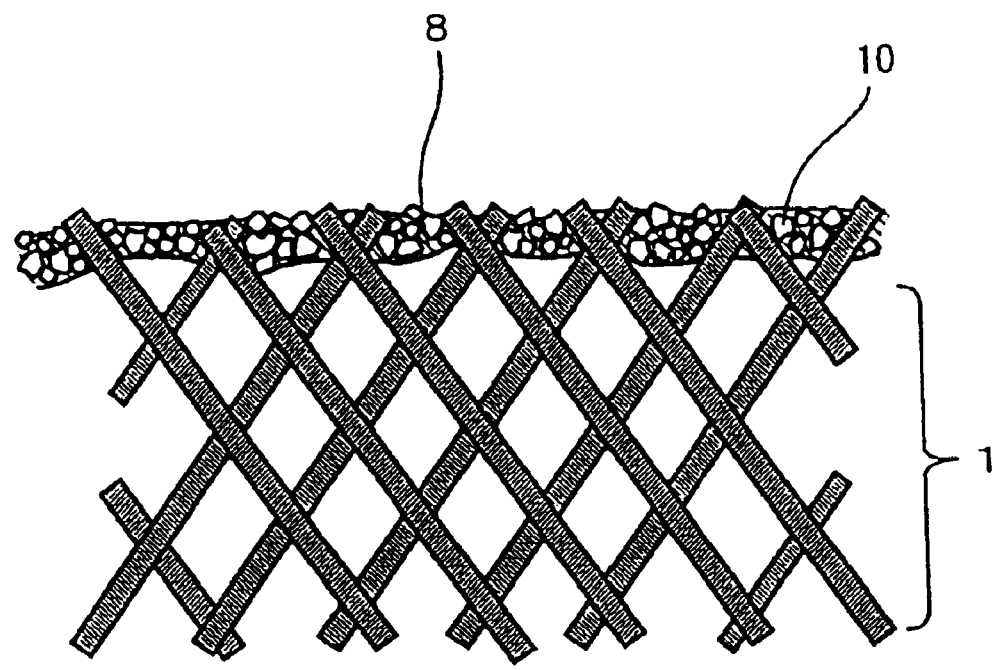
FIG. 5 is a schematic sectional view of one embodiment of the present invention, showing a state in which hydrogen permeable films are formed only inside the porous support with alumina powder filled on the surface thereof.

The thus obtained disk was heat-treated at a temperature of 500° C. for 1 hour in hydrogen under 101.325 kPa (1 atmospheric pressure). After the heat treatment, the disk was cut and the cut section was observed with an electron microscope. FIG. 5 schematically shows the observed section. As a result of the observation, it was confirmed that the γ-alumina 10 was filled into pores of the porous silicon nitride up to a depth of 0.5 μm from the Pd-deposited disk surface and Pd 8 was deposited in gaps between particles of the γ-alumina powder. It was also confirmed that Pd was not deposited on the surface of the porous disk made of silicon-nitride.

The hydrogen permeability of the hydrogen permeable structure obtained as described above was measured in the same manner as in EXAMPLE 1. As a result, it was confirmed that the permeation amount of hydrogen was 140 ml/min/cm$^2$ and the permeation amount of nitrogen was 0.02 ml/min/cm$^2$, and hence that practically only hydrogen was allowed to selectively pass through the structure. Also, a heat cycle test of 1000 cycles was conducted between the temperature of 400° C. and room temperature in a hydrogen gas atmosphere of 101.325 kPa (1 atmospheric pressure). After the test, peeling-off and cracks of the film were inspected by visual observation and by using an electron microscope, respectively. As a result, no physical deterioration of the film, such as peeling-off and cracks, was observed. Thus, it was found that by forming Pd-containing thin films only inside the porous support the durability was greatly improved. Further, Pd deposited in the disk was dissolved in aqua regia and subjected to Inductively Coupled Plasma (ICP) emission spectroscopic analysis. As a result, the amount of Pd was 1.5g/m$^2$. Accordingly, it was found that the amount of Pd was reduced to half by employing the spraying method because the amount of Pd deposited in the hydrogen permeable structure by the method of immersing the disk in the reductant-containing solution, as with EXAMPLE 8, was 3.0 g/m$^2$.

EXAMPLE 10

The surface of the disk-shaped hydrogen permeable structure obtained with EXAMPLE 8, on which a Pd film was formed, was artificially abraded and flawed 10 times using a No. 1200 polishing paper. The amount of nitrogen having passed through the flawed disk was measured in the same manner as in EXAMPLE 1. As a result, the measured amount was 15 ml/min/cm$^2$, which was considerably increased from 0.05 ml/min/cm$^2$, i.e., the amount measured prior to flawing of the disk. In other words, it was evident that the Pd thin film was partly broken.

A Pd film was formed on the flawed disk in the same manner and under the same conditions as those in EXAMPLE 8. The disk thus repaired was measured for permeability of hydrogen or nitrogen in the same manner as in EXAMPLE 1. As a result, it was confirmed that the permeation amount of hydrogen was 120 ml/min/cm$^2$ and the permeation amount of nitrogen was 0.05 ml/min/cm$^2$. It was hence found that the flaws were repaired and the disk was restored to its original permeability.

INDUSTRIAL APPLICABILITY

According to the present invention, as described above, physical deterioration of the hydrogen permeable film, such as peeling-off and cracks, can be greatly reduced and durability of the hydrogen permeable film can be increased. Also, the position where a thin film containing Pd is to be formed can be controlled as desired, and defects such as pinholes can easily be repaired.

What is claimed is:

1. A method of manufacturing a hydrogen permeable structure, comprising the steps of supplying a solution containing Pd onto one surface of a porous support and supplying a solution containing a reductant onto the other surface of said porous support, thereby forming a thin film containing Pd on the surface of said porous support or inside said porous support.

2. A method of manufacturing a hydrogen permeable structure, comprising the steps of supplying a solution containing Pd onto one surface of a porous support and supplying a reducing gas onto the other surface of said porous support, thereby forming a thin film containing Pd on the surface of said porous support or inside said porous support.

3. A method of manufacturing a hydrogen permeable structure according to claim 2, further comprising the steps of filling a gas permeable material within pores of said porous support, thereby forming a thin film containing Pd on an end surface of said gas permeable material.

4. A method of manufacturing a hydrogen permeable structure according to claim 1, wherein the solution containing Pd contains a complex ion in which ligands are coordinated in number of not less than two and not more than six per one Pd atom.

5. A method of manufacturing a hydrogen permeable structure according to claim 2, wherein the solution containing Pd contains a complex ion in which ligands are coordinated in number of not less than two and not more than six per one Pd atom.

6. A method of manufacturing a hydrogen permeable structure according to claim 1, wherein the solution containing Pd is a solution containing chlorine and palladium.

7. A method of manufacturing a hydrogen permeable structure according to claim 2, wherein the solution containing Pd is a solution containing chlorine and palladium.

8. A method of manufacturing a hydrogen permeable structure according to claim 1, wherein the solution containing Pd is a solution containing chlorine, palladium and platinum.

9. A method of manufacturing a hydrogen permeable structure according to claim 2, wherein the solution containing Pd is a solution containing chlorine, palladium and platinum.

10. A method of manufacturing a hydrogen permeable structure according to claim 1, wherein the solution containing the reductant contains at least one of $H_2PO_2^-$ and $HPO_3^{2-}$.

11. A method of manufacturing a hydrogen permeable structure according to claim 1, wherein the solution containing the reductant contains dimethylamine borane.

12. A method of manufacturing a hydrogen permeable structure according to claim 1, wherein the solution containing the reductant is a solution in which at least one of $NaBH_4$, $LiBH_4$ and $KBH_4$ is dissolved.

13. A method of manufacturing a hydrogen permeable structure according to claim 1, wherein one or both of the solution containing Pd and the solution containing the reductant are sprayed in a state of mist.

14. A method of manufacturing a hydrogen permeable structure according to claim 2, wherein the reducing gas is a hydrogen gas.

15. A method of manufacturing a hydrogen permeable structure according to claim 3, wherein the gas permeable material is paraffin.

16. A method of repairing a hydrogen permeable structure, comprising the steps of supplying a solution containing Pd onto one surface of said hydrogen permeable structure in which a thin film containing Pd has been formed on the surface of or inside a porous support and supplying a solution containing a reductant onto the other surface of said hydrogen permeable structure, thereby forming a thin film containing Pd in pinholes or other defects of said former thin film containing Pd.

17. A method of repairing a hydrogen permeable structure, comprising the steps of supplying a solution containing Pd through one surface of said hydrogen permeable structure in which a thin film containing Pd has been formed on the surface of or inside a porous support and supplying a reducing gas through the other surface of said hydrogen permeable structure, thereby forming a thin film containing Pd in pinholes or other defects of said former thin film containing Pd.

18. A hydrogen permeable structure wherein thin films formed on and/or in a porous support and containing Pd have an average thickness of not more than 2 $\mu$m.

19. A hydrogen permeable structure according to claim 18, wherein thin films formed inside said porous support and containing Pd have an average thickness of not more than 2 $\mu$m.

20. A hydrogen permeable structure according to claim 19, wherein an amount of deposited Pd is not more than 5 g/m$^2$ in the thin films formed on and/or in said porous support and containing Pd.

21. A hydrogen permeable structure according to claim 18, wherein said porous support is a porous body of silicon nitride.

22. A hydrogen permeable structure according to claim 18, wherein said porous support is a metallic porous body.

23. A hydrogen permeable structure according to claim 18, wherein said porous support has holes in the surface thereof, and said hydrogen permeable structure includes a porous oxide layer, or a layer of metal or metal oxide having an average particle size of not more than 2 $\mu$m, said layer being formed so as to fill the holes.

24. A hydrogen permeable structure according to claim 23, wherein said oxide layer contains at least one selected from the group consisting of aluminum oxide, silicon dioxide and zirconium oxide.

25. A hydrogen permeable structure according to claim 23, wherein said oxide layer is made of aluminum oxide.

26. A hydrogen permeable structure including a layer in which pores are sealed off by depositing a metal containing Pd in a porous support and/or porous powder.

27. A hydrogen permeable structure according to claim 26, wherein an amount of nitrogen permeable through said hydrogen permeable structure is not more than 0.6 ml/min/cm$^2$ under a differential pressure of 1 atmospheric pressure.

* * * * *